US009960989B2

(12) United States Patent
Kumar et al.

(10) Patent No.: US 9,960,989 B2
(45) Date of Patent: *May 1, 2018

(54) UNIVERSAL DEVICE TESTING SYSTEM

(71) Applicant: Contec, LLC, Schnectady, NY (US)

(72) Inventors: Samant Kumar, San Jose, CA (US); Dinesh Kumar, Bihar (IN); Shivashankar Diddimani, Karnataka (IN); Gunjan Samaiya, Madhya Pradesh (IN)

(73) Assignee: Contec, LLC, Schenectady, NY (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/866,630

(22) Filed: Sep. 25, 2015

(65) Prior Publication Data
US 2017/0093682 A1    Mar. 30, 2017

(51) Int. Cl.
*G06F 15/173* (2006.01)
*H04L 12/26* (2006.01)
*H04L 12/24* (2006.01)
*G06F 11/30* (2006.01)

(52) U.S. Cl.
CPC ......... *H04L 43/50* (2013.01); *G06F 11/30* (2013.01); *G06F 11/3003* (2013.01); *G06F 11/3065* (2013.01); *G06F 11/3089* (2013.01); *G06F 11/3093* (2013.01); *H04L 41/22* (2013.01); *H04L 43/00* (2013.01); *H04L 43/12* (2013.01)

(58) Field of Classification Search
CPC ............ H04L 29/0809–29/08108; H04L 43/00–43/045; H04L 43/10; H04L 43/12; H04L 43/50; G06F 11/30–11/3065; G06F 11/3089–11/3096
See application file for complete search history.

(56) References Cited

U.S. PATENT DOCUMENTS

| | | | |
|---|---|---|---|
| 5,005,197 A | 4/1991 | Parsons et al. | |
| 5,897,609 A * | 4/1999 | Choi | H04L 43/50 370/241 |
| 5,917,808 A | 6/1999 | Koshbab | |
| 6,088,582 A | 7/2000 | Canora et al. | |
| 6,308,496 B1 | 10/2001 | Lee | |
| 6,367,032 B1 | 4/2002 | Kasahara | |
| 6,662,135 B1 | 12/2003 | Burns | |
| 6,671,160 B2 | 12/2003 | Hayden | |
| 6,826,512 B2 | 11/2004 | Dara-Abrams et al. | |

(Continued)

FOREIGN PATENT DOCUMENTS

| | | |
|---|---|---|
| CN | 202261360 | 5/2012 |
| WO | 2001013604 | 2/2001 |

(Continued)

OTHER PUBLICATIONS

Kumar, Samant; Issue Notification for U.S. Appl. No. 14/866,780, filed Sep. 25, 2015, dated Oct. 19, 2016, 1 pg.

(Continued)

*Primary Examiner* — Brendan Higa
(74) *Attorney, Agent, or Firm* — Taylor English Duma LLP

(57) ABSTRACT

A system for testing multiple disparate or similar devices independently and simultaneously using different types of device probes is disclosed. The system includes real-time, bi-directional/asynchronous communication and interaction between the system components.

10 Claims, 3 Drawing Sheets

(56) References Cited

U.S. PATENT DOCUMENTS

| | | |
|---|---|---|
| 6,859,043 B2 | 2/2005 | Ewing |
| 7,664,317 B1 | 2/2010 | Sowerby |
| 7,809,517 B1 | 10/2010 | Zuckerman |
| 8,121,028 B1 | 2/2012 | Schlesener |
| 8,209,732 B2 | 6/2012 | Le et al. |
| 8,229,344 B1 | 7/2012 | Petersen |
| 8,324,909 B2 | 12/2012 | Oakes et al. |
| 8,418,000 B1 | 4/2013 | Salame |
| 8,418,219 B1 | 4/2013 | Parsons et al. |
| 8,515,015 B2 | 8/2013 | Maffre |
| 8,689,071 B2 | 4/2014 | Valakh |
| 8,806,400 B1 | 8/2014 | Bhawmik |
| 9,013,307 B2 | 4/2015 | Hussain |
| 9,270,983 B1 | 2/2016 | Hare, Jr. |
| 9,316,714 B2 | 4/2016 | Rada |
| 9,319,908 B2 | 4/2016 | Nickel |
| 9,372,228 B2 | 6/2016 | Nickel |
| 9,402,601 B1 | 8/2016 | Berger |
| 9,490,920 B2 | 11/2016 | Parte |
| 9,491,454 B1 * | 11/2016 | Kumar ............... H04N 17/04 |
| 9,571,211 B2 | 2/2017 | Partee |
| 9,810,735 B2 | 11/2017 | Kumar et al. |
| 9,838,295 B2 | 12/2017 | Kumar et al. |
| 9,900,113 B2 | 2/2018 | Kumar et al. |
| 9,900,116 B2 | 2/2018 | Kumar et al. |
| 2002/0070725 A1 | 6/2002 | Hilliges |
| 2002/0077786 A1 * | 6/2002 | Vogel .................. H04L 41/22 |
| | | 702/188 |
| 2003/0005380 A1 | 1/2003 | Nguyen |
| 2003/0184035 A1 | 10/2003 | Yu |
| 2004/0010584 A1 * | 1/2004 | Peterson ............ H04L 41/046 |
| | | 709/224 |
| 2004/0016708 A1 | 1/2004 | Rafferty |
| 2004/0160226 A1 | 8/2004 | Ewing |
| 2004/0189281 A1 | 9/2004 | Le et al. |
| 2005/0041642 A1 | 2/2005 | Robinson |
| 2005/0053008 A1 | 3/2005 | Griesing |
| 2005/0102488 A1 * | 5/2005 | Bullis .................. H04L 43/00 |
| | | 712/14 |
| 2005/0193294 A1 | 9/2005 | Hildebrant |
| 2005/0286466 A1 | 12/2005 | Tagg |
| 2006/0015785 A1 | 1/2006 | Chun |
| 2006/0271322 A1 * | 11/2006 | Haggerty .......... G06F 11/2273 |
| | | 702/108 |
| 2007/0097659 A1 | 5/2007 | Behrens |
| 2007/0220380 A1 | 9/2007 | Ohanyan |
| 2008/0117907 A1 * | 5/2008 | Hein .................. H04L 43/50 |
| | | 370/392 |
| 2008/0144293 A1 | 6/2008 | Aksamit |
| 2008/0159737 A1 | 7/2008 | Noble et al. |
| 2008/0168520 A1 | 7/2008 | Vanderhoff |
| 2008/0274712 A1 | 11/2008 | Rofougaran |
| 2008/0315898 A1 | 12/2008 | Cannon |
| 2009/0089854 A1 | 4/2009 | Le |
| 2009/0282446 A1 | 11/2009 | Breed |
| 2009/0282455 A1 | 11/2009 | Bell et al. |
| 2009/0289020 A1 | 11/2009 | Wurmhoringer |
| 2010/0132000 A1 | 5/2010 | Straub |
| 2010/0138823 A1 | 6/2010 | Thornley |
| 2010/0246416 A1 | 9/2010 | Sinha |
| 2011/0001833 A1 | 1/2011 | Grinkemeyer |
| 2011/0006794 A1 | 1/2011 | Sellathamby |
| 2011/0012632 A1 | 1/2011 | Merrow |
| 2011/0035676 A1 | 2/2011 | Tischer |
| 2011/0072306 A1 | 3/2011 | Racey |
| 2011/0090075 A1 * | 4/2011 | Armitage ............ B60W 40/09 |
| | | 340/439 |
| 2011/0099424 A1 | 4/2011 | Rivera Trevino |
| 2011/0116419 A1 | 5/2011 | Cholas |
| 2011/0222549 A1 | 9/2011 | Connelly |
| 2011/0267782 A1 | 11/2011 | Petrick |
| 2011/0306306 A1 | 12/2011 | Reed |
| 2012/0140081 A1 | 1/2012 | Clements |
| 2012/0122406 A1 | 5/2012 | Gregg et al. |
| 2012/0163227 A1 | 6/2012 | Kannan |
| 2012/0198084 A1 * | 8/2012 | Keskitalo ............. H04L 67/02 |
| | | 709/228 |
| 2012/0198442 A1 | 8/2012 | Kashyap |
| 2012/0213259 A1 | 8/2012 | Renken et al. |
| 2012/0220240 A1 | 8/2012 | Rothschild |
| 2012/0275784 A1 | 11/2012 | Soto |
| 2012/0278826 A1 | 11/2012 | Jones |
| 2013/0033279 A1 | 2/2013 | Sozanski |
| 2013/0049794 A1 | 2/2013 | Humphrey |
| 2013/0076217 A1 | 3/2013 | Thompson |
| 2013/0093447 A1 | 4/2013 | Nickel |
| 2013/0104158 A1 | 4/2013 | Partee |
| 2013/0160064 A1 | 6/2013 | Van Rozen |
| 2013/0167123 A1 | 6/2013 | Dura |
| 2013/0257468 A1 | 10/2013 | Mlinarsky |
| 2013/0305091 A1 * | 11/2013 | Stan .................. G06F 11/263 |
| | | 714/35 |
| 2014/0091874 A1 | 4/2014 | Cook et al. |
| 2014/0115580 A1 | 4/2014 | Kellerman |
| 2014/0123200 A1 | 5/2014 | Park et al. |
| 2014/0126387 A1 * | 5/2014 | Gintis ................ H04L 43/045 |
| | | 370/252 |
| 2014/0156819 A1 | 6/2014 | Cavgalar |
| 2014/0187172 A1 | 7/2014 | Partee |
| 2014/0187173 A1 | 7/2014 | Partee |
| 2014/0207404 A1 | 7/2014 | Fritzsche |
| 2014/0256373 A1 | 9/2014 | Hernandez |
| 2014/0266930 A1 | 9/2014 | Huynh |
| 2014/0269871 A1 | 9/2014 | Huynh |
| 2014/0282783 A1 | 9/2014 | Totten |
| 2014/0370821 A1 | 12/2014 | Guterman |
| 2015/0024720 A1 * | 1/2015 | Efrati ................ H04W 12/02 |
| | | 455/414.1 |
| 2015/0093987 A1 | 4/2015 | Ouyang |
| 2015/0109941 A1 | 4/2015 | Zhang |
| 2015/0151669 A1 | 6/2015 | Meisner |
| 2015/0180743 A1 * | 6/2015 | Jana .................. H04L 43/045 |
| | | 715/736 |
| 2015/0226716 A1 | 8/2015 | Nelson |
| 2015/0237010 A1 | 8/2015 | Roskind |
| 2015/0253357 A1 | 9/2015 | Olgaard |
| 2015/0288589 A1 | 10/2015 | Radford et al. |
| 2015/0369851 A1 | 12/2015 | Even |
| 2016/0080241 A1 | 3/2016 | Rocha De Maria |
| 2016/0102951 A1 | 4/2016 | Cole |
| 2016/0191364 A1 * | 6/2016 | Ajitomi .................. H04L 43/10 |
| | | 709/224 |
| 2016/0381818 A1 | 12/2016 | Mills |
| 2017/0048519 A1 | 2/2017 | Friel |
| 2017/0089981 A1 | 3/2017 | Kumar |
| 2017/0093683 A1 | 3/2017 | Kumar |
| 2017/0126536 A1 | 5/2017 | Kumar |
| 2017/0126537 A1 | 5/2017 | Kumar |
| 2017/0126539 A1 | 5/2017 | Tiwari |
| 2017/0149635 A1 | 5/2017 | Kumar |
| 2017/0149645 A1 | 5/2017 | Kumar |
| 2017/0195071 A1 | 7/2017 | Kumar |
| 2017/0250762 A1 | 8/2017 | Kumar et al. |
| 2017/0288791 A1 | 10/2017 | Kumar et al. |
| 2017/0288993 A1 | 10/2017 | Kumar et al. |
| 2017/0289012 A1 | 10/2017 | Tiwari et al. |
| 2017/0302994 A1 | 10/2017 | Kumar |
| 2018/0024193 A1 | 1/2018 | Kumar et al. |
| 2018/0076908 A1 | 3/2018 | Kumar et al. |
| 2018/0077046 A1 | 3/2018 | Kumar et al. |

FOREIGN PATENT DOCUMENTS

| | | |
|---|---|---|
| WO | 2013169728 | 11/2013 |
| WO | 2014035462 | 3/2014 |
| WO | 2014065843 | 5/2014 |
| WO | WO2017053961 | 3/2017 |
| WO | WO2017074872 | 5/2017 |

OTHER PUBLICATIONS

Kumar, Samant; Notice of Allowance for U.S. Appl. No. 14/866,780, filed Sep. 25, 2015, dated Jul. 19, 2016, 8 pgs.

(56) References Cited

OTHER PUBLICATIONS

Kumar, Samant; Non-Final Office Action for U.S. Appl. No. 14/866,720, filed Sep. 25, 2015, dated Jan. 23, 2017, 17 pgs.
Kumar, Samant; Notice of Allowance for U.S. Appl. No. 14/987,538, filed Jan. 4, 2016, dated Mar. 23, 2017, 12 pgs.
Kumar, Samant; Non-Final Office Action for U.S. Appl. No. 15/057,085, filed Feb. 29, 2016, dated Apr. 7, 2017, 15 pgs.
Kumar, Samant; International Search Report and Written Opinion for PCT/U516/53768, filed Sep. 26, 2016, dated Feb. 3, 2017, 17 pgs.
Nordman, Bruce, "Testing Products with Network Connectivity," Jun. 21, 2011 [retrieved online at http://citeseerx.is1. psu.edu/viewdoc/download?doi=10.1.1.695.772&rep=rep1&type=pdf on Feb. 6, 2017], 20 pgs.
Kumar, Samant; International Search Report and Written Opinion for PCT/U52016/058507, filed Oct. 24, 2016, dated Jan. 3, 2017, 12 pgs.
Kumar, Samant; Notice of Allowance for U.S. Appl. No. 14/866,720, filed Sep. 25, 2015, dated Jun. 29, 2017, 26 pgs.
Kumar, Samant; Notice of Allowance for U.S. Appl. No. 14/866,720, filed Sep. 25, 2015, dated Aug. 28, 2017, 11 pgs.
Kumar, Samant; Response to Rule 312 Communication for U.S. Appl. No. 14/866,720, filed Sep. 25, 2015, dated Jul. 26, 2017, 2 pgs.
Kumar, Samant; Ex-Parte Quayle Office Action for U.S. Appl. No. 14/948,925, filed Nov. 23, 2015, dated May 20, 2017, 29 pgs.
Kumar, Samant; Non-Final Office Action for U.S. Appl. No. 14/987,538, filed Jan. 4, 2016, dated Jul. 21, 2017, 18 pgs.
Kumar, Samant; Non-Final Office Action for U.S. Appl. No. 15/624,961, filed Jun. 16, 2017, dated Jul. 19, 2017, 7 pgs.
Kumar, Samant; Non-Final Office Action for U.S. Appl. No. 14/929,180, filed Oct. 30, 2015, dated Mar. 22, 2017, 32 pgs.
Kumar, Samant; Non-Final Office Action for U.S. Appl. No. 14/929,220, filed Oct. 30, 2015, dated Mar. 24, 2017, 31 pgs.
Businesswire; Article entitled: "GENBAND and CTDI Settle Legal Dispute", located at <http://www.businesswire.com/news/home/20140321005528/en/GENBAND-CTDI-Settle-Legal-Dispute>, Mar. 21, 2014, 1 pg.
CED Magazine; Article entitled: "Cable Connects in Atlanta", located at <https://www.cedmagazine.com/article/2006/04/cable-connects-atlanta>, Apr. 30, 2006, 21 pgs.
TVTechnology; Article entitled: "S3 Group's StormTest", located at <http://www.tvtechnology.com/expertise/0003/s3-groups-stormtest/256690>, published May 1, 2012, 2 pgs.
Digital Producer; Article entitled: "S3 Group Unveils Exclusive Partnership in North America With First US StormTest(TM) Decision Line Customer", located at <http://www.digitalproducer.com/article/S3-Group-Unveils-Exclusive-Partnership-in-North-America-With-First-US-StormTest(TM)-Decision-Line-Customer--1668213>, Sep. 8, 2011, 3 pgs.
Electronic Design; Article entitled: "Testing of MPEG-2 Set-Top Boxes Must be Fast, Thorough", located at <http://www.electronicdesign.com/print/839>, published Nov. 18, 2001, 9 pgs.

Euromedia; Article entitled: "Automated TV Client testing: Swisscom partners with S3 Group to deliver the ultimate IPTV experience", located at <http://advanced-television.com/wp-content/uploads/2012/10/s3.pdf>, earliest known pub. date—May 30, 2013, 2 pgs.
S3 Group; Document entitled: "White Paper: The Importance of Automated Testing in Set-Top Box Integration", earliest known publication date Jun. 17, 2014, 11 pgs.
Promptlink Communications; Article entitled: "Promptlink Communications Officially Launches Sep-Top Box Testing Platform", located at <https://www.promptlink.com/company/assets/media/2014-05-20.pdf>, published on May 20, 2014, 2 pgs.
TELEPLAN; Article entitled: "Screening & Testing", located at <https://www.teleplan.com/innovative-services/screening-testing/>, earliest known publication date Mar. 21, 2015, 7 pgs.
Kumar, Samant; Issue Notification for U.S. Appl. No. 14/866,720, filed Sep. 25, 2015, dated Oct. 18, 2017, 1 pg.
Kumar, Samant; Notice of Allowance for U.S. Appl. No. 14/948,925, filed Nov. 23, 2015, dated Sep. 20, 2017, 15 pgs.
Kumar, Samant; Supplemental Notice of Allowance for U.S. Appl. No. 14/948,925, filed Nov. 23, 2015, dated Oct. 5, 2017, 2 pgs.
Kumar, Samant; Notice of Allowance for U.S. Appl. No. 15/057,085, filed Feb. 29, 2016, dated Sep. 29, 2017, 28 pgs.
Kumar, Samant; Non-Final Office Action for U.S. Appl. No. 15/642,915, filed Jul. 6, 2017, dated Nov. 1, 2017, 42 pgs.
Kumar, Samant; Issue Notification for U.S. Appl. No. 14/948,925, filed Nov. 23, 2015, dated Nov. 16, 2017, 1 pg.
Kumar, Samant; Non-Final Office Action for U.S. Appl. No. 14/948,143, filed Nov. 20, 2015, dated Dec. 28, 2017, 39 pgs.
Kumar, Samant; Corrected Notice of Allowance for U.S. Appl. No. 14/987,538, filed Jan. 4, 2016, dated Jan. 10, 2018, 8 pgs.
Kumar, Samant; Notice of Allowance for U.S. Appl. No. 14/987,538, filed Jan. 4, 2016, dated Dec. 4, 2017, 20 pgs.
Kumar, Samant; Notice of Non-Compliant Amendment for U.S. Appl. No. 15/624,961, filed Jun. 16, 2017, dated Jan. 10, 2018, 5 pgs.
Kumar, Samant; Corrected Notice of Allowance for U.S. Appl. No. 15/057,085, filed Feb. 29, 2016, dated Oct. 31, 2017, 6 pgs.
Tiwari, Rajeev; Non-Final Office Action for U.S. Appl. No. 15/348,920, filed Nov. 10, 2016, dated Nov. 20, 2017, 53 pgs.
Kumar, Samant; Non-Final Office Action for U.S. Appl. No. 14/866,752, filed Sep. 25, 2015, dated Nov. 7, 2017, 26 pgs.
Kumar, Samant; Response to Amendment under Rule 312 for U.S. Appl. No. 14/987,538, filed Jan. 4, 2016, dated Jan. 17, 2018, 2 pgs.
Kumar, Samant; Notice of Allowance for U.S. Appl. No. 14/948,143, filed Nov. 20, 2015, dated Jan. 25, 2018, 13 pgs.
Tiwari, Rajeev; Non-Final Office Action for U.S. Appl. No. 15/624,967, filed Jun. 16, 2017, dated Nov. 7, 2017, 52 pgs.
Kumar, Samant; Certificate of Correction for U.S. Appl. No. 14/866,720, filed Sep. 25, 2015, dated Feb. 13, 2018, 1 pg.
Kumar, Samant; Issue Notification for U.S. Appl. No. 14/987,538, filed Jan. 4, 2016, dated Jan. 31, 2018, 1 pg.
Kumar, Samant; Issue Notification for U.S. Appl. No. 15/057,085, filed Feb. 29, 2016, dated Jan. 31, 2018.

\* cited by examiner

UNIVERSAL DEVICE TESTING SYSTEM

CROSS REFERENCE TO RELATED APPLICATIONS

This application is related to patent application Ser. No. 14/866,720 entitled, "Core Testing Machine," filed Sep. 25, 2015, now U.S. Pat. No. 9,810,735, and to patent application Ser. No. 14/866,752 entitled, "Universal Device Testing Interface," filed Sep. 25, 2015 and published Mar. 30, 2017 as U.S. Patent Application Publication No. 2017/0093683, and to patent application Ser. No. 14/866,780 entitled, "Set Top Boxes Under Test," filed Sep. 25, 2015, now U.S. Pat. No. 9,491,454, each of which is incorporated by reference in its entirety. This application is also related to patent application Ser. No. 14/948,143 entitled, "Cable Modems/EMTAs Under Test," filed Nov. 20, 2015 and published May 25, 2017 as U.S. Patent Application Publication No. 2017/0149635, and to patent application Ser. No. 14/948,925 entitled, "Wireless Routers Under Test," filed Nov. 23, 2015, now U.S. Pat. No. 9,838,295, and to patent application Ser. No. 14/929,180 entitled, "Hardware Architecture for Universal Testing System: Cable Modem Test," filed Oct. 30, 2015 and published May 4, 2017 as U.S. Patent Application Publication No. 2017/0126536, and to patent application Ser. No. 14/929,220 entitled, "Hardware Architecture for Universal Testing System: Wireless Router Test," filed Oct. 30, 2015 and published May 4, 2017 as U.S. Patent Application Publication No. 2017/0126537, and to patent application Ser. No. 14/987,538 entitled, "Test Sequences Using Universal Testing System", filed Jan. 4, 2016 and published Jul. 6, 2017 as U.S. Patent Application Publication No. 2017/0195071.

TECHNICAL FIELD

The present invention is directed to a system for testing devices.

DETAILED DESCRIPTION

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, an innovative system can test a set of devices simultaneously. Further, such a testing system is capable of testing disparate devices simultaneously. Non-limiting examples of devices under test (DUTs) include set top boxes, cable modems, embedded multimedia terminal adapters, and wireless routers including broadband wireless routers for the home or for commercial networks.

According to certain embodiments, such a testing system provides a separate set of interfaces for each device that is under testing of the set of devices. Further, such a system is designed to be adaptive by being extendable for testing new devices with corresponding new testing interfaces without fundamentally changing the core architecture of the testing system. As a non-limiting example, the testing system includes a core testing subsystem with a user interface and asynchronous communication among the system components such that new types of devices and new tests can be added and executed in a seamless fashion.

According to certain embodiments, the user interface can communicate through web sockets with the universal tester. Such communication is in real-time, bi-directional and asynchronous so that the user can control and monitor the testing of multiple devices simultaneously and independently of each other using the same universal tester.

According to certain embodiments, the testing system is capable of testing a set of similar types of devices or a set of disparate devices.

Figure 1:
FIG. 1 illustrates a high-level system architecture for testing devices, according to certain embodiments.

According to certain embodiments, a testing solution system can be a three layer implementation. The number of layers may vary from implementation to implementation. FIG. 1 illustrates a high-level system architecture for testing devices, according to certain embodiments. FIG. 1 shows a test bench browser interface 102 that is in communication with a web-socket 104, that is, in turn, in communication with a core testing processor 106. According to certain embodiments, the communication between the test bench browser 102, web-socket 104 and core testing processor 106 can be a TCP/IP communication. As a non-limiting example, the web browser is used as a user interface that communicates through web-sockets with the core testing processor. As a non-limiting example, communication may be in the form of JSON messages using TCP/IP protocol, according to certain embodiments. JSON is Java script object notation for transmitting data between the server and web applications.

Figure 2:
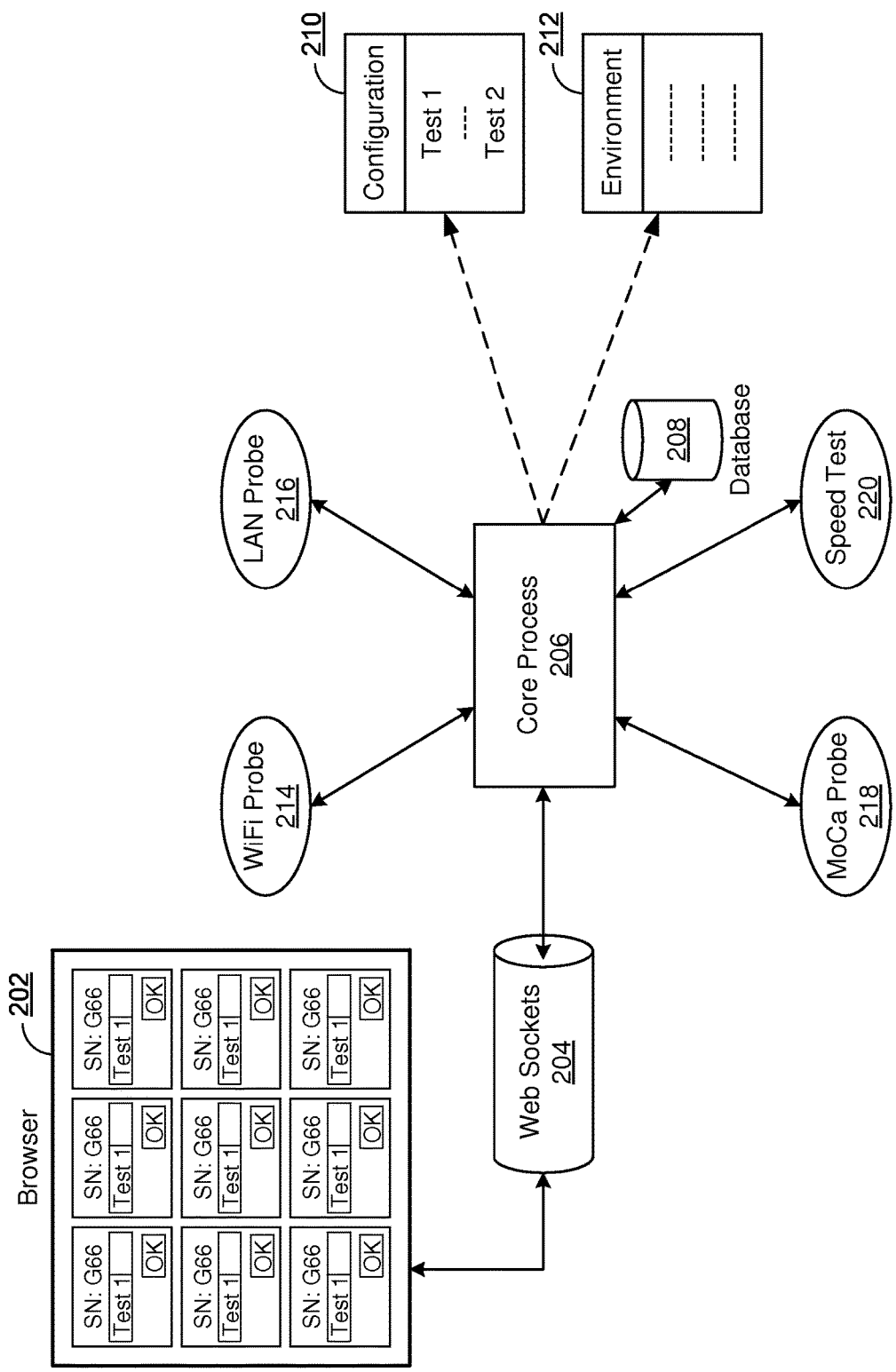
FIG. 2 illustrates some of the testing components and the interaction between the testing components, according to certain embodiments.

FIG. 2 illustrates some of the testing components and the interaction between the testing components, according to certain embodiments. FIG. 2 shows a user interface 202, web-sockets 204, a core testing processor 206, database 208, test configuration modules 210, testing environmental modules 212, a plurality of probes (214, 216, 218) to connect the devices under test (DUT) to the core testing processor 206, and a speed test module 220, according to certain embodiments. Speed testing is used for evaluating the performance of the Wifi and other media network connection and accessibility of the device under test. FIG. 2 shows as non-limiting examples, a Wifi probe 214, an Ethernet local area network (LAN) probe 216 and a MOCA probe 218. In other words, according to certain embodiments, various probes can be included such as an wireless local area network (WLAN) probe, an Ethernet wide area network (WAN) probe, a multimedia over coax alliance (MoCA) WAN probe, a MoCA LAN probe and a wireless probe via antenna. According to certain embodiments, servers and other components in the testing system may be distributed over a plurality of computers.

According to certain embodiments, core testing processor 206 loads and reads files from test configuration modules 210 and test environmental modules 212 to initialize various components of the testing system. When the system is ready to begin testing after the initialization process, the system notifies a user that is using the testing system to test one or more devices (DUTs) of the readiness of the testing system. The user installs each device (DUT) of the set of DUTs that are to be tested on the test bench and the serial number of each DUT is scanned. The core testing processor 206 receives the serial number information of each DUT and using the serial number, retrieves further information associated with each DUT based on the serial number from database 208, according to certain embodiments. The core testing processor 206 dynamically loads test configuration information 210 and test environment information 212 based on device information such as make, model etc of a given DUT. After the test configuration and test environment information are loaded, the core testing processor 206 begins executing the various tests corresponding to each DUT so that the set of DUTs can be tested simultaneously. Each test may correspond to underlying testing modules associated with Wifi, LAN, WAN or MoCA etc, interfaces of the DUT and such modules can be executed locally, remotely or at the device.

According to certain embodiments, the test configuration information identifies the test modules and corresponding testing scripts that are to be executed by the core testing processor 206 at run time. The core testing processor 206 also provides the test results and other feedback information to the user via the browser user interface 202 and web sockets 204. Further, the user can send user input and requests to the system through the browser user interface 202 and web sockets 204.

According to certain embodiments, core testing processor 206 determines the success or failure of a given test based on the test configuration parameters and output results of the testing. Further, upon failure of a given test, core testing processor 206 may continue further testing or halt test execution based on test configuration parameters, according to certain embodiments.

Upon completion of the relevant tests, a success message can be sent to the user via the browser user interface 202 and web sockets 204. Even though the DUTs in the set of DUTs are tested simultaneously, the user does not have to wait until all the DUTs in the set have been completed to begin installing other devices that need testing. Further, the testing of the devices need not be started at the same time. Soon after the testing is completed for a given DUT, the tested DUT may be uninstalled from its slot in the test bench and a new DUT can be installed in its slot so that testing can begin for the newly installed device.

According to certain embodiments, the test results can be stored locally and/or pushed to the cloud so that the results can be viewed remotely from any location. Further, the test results can be aggregated. According to certain embodiments, aggregated data includes data combined from several data measurements. Summary reports can be generated from such aggregated data. Non-limiting examples of summary reports include charts and graphs that display information on all the DUTs or at least a subset of the DUTs. Thus, the summary reports generated from the aggregated data can provide an overview of the testing information and characteristics of the DUTs. The aggregated data can reveal trends and other related information associated with the DUTs. Further, the aggregated data can include user-level data, access account activity, etc. According to certain embodiments, the testing system includes a billing system to charge for the testing services for each device.

Figure 3:
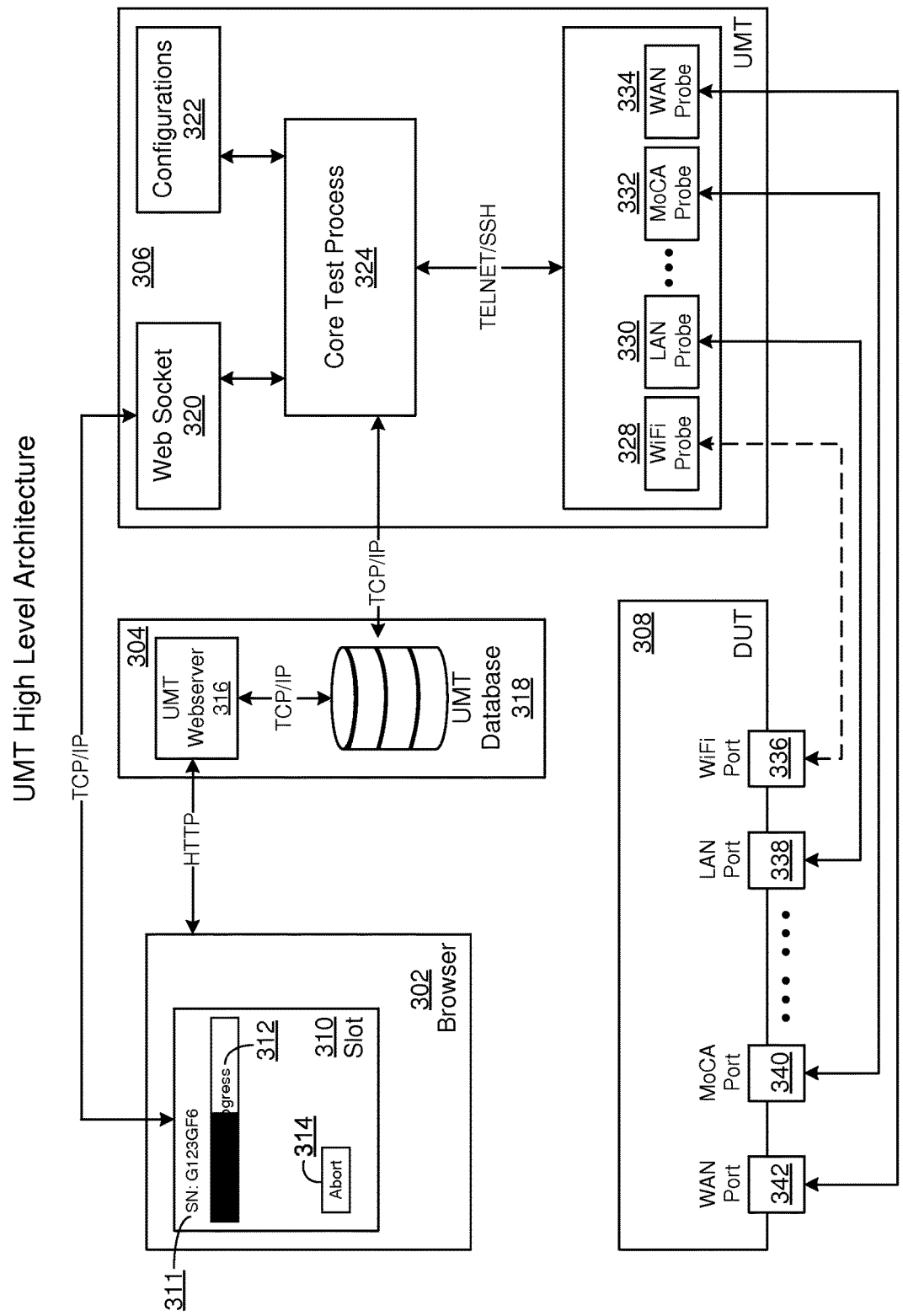
FIG. 3 illustrates a sample architecture that includes the testing components, according to certain embodiments.

FIG. 3 illustrates a sample architecture that includes the testing components of a universal tester, according to certain embodiments. FIG. 3 shows a browser user interface or operator dashboard 302, a test controller 304, a universal tester 306 and a device under test (DUT) 308. There may be multiple devices under testing simultaneously but only one device under test is shown for convenience in FIG. 3.

According to certain embodiments, browser user interface or operator dashboard 302 may include information 310 associated with each device under test. The information 310 can include DUT serial number 311, and testing progress information 312. Browser user interface or operator dashboard 302 may also include user command function buttons 314 and drop down menus (not shown in FIG. 3). According to certain embodiments, the user can configure slot details (e.g., port numbers, IP address for the slot, etc), configure testing preferences such as push to cloud, export to billing, etc.

According to certain embodiments, test controller 304 may include a universal tester webserver 316 that is in communication (e.g., TCP/IP) with a universal tester database 318. A billing process within the controller (not shown in FIG. 3) may be in communication with a billing service or application (not shown in FIG. 3). As a non-limiting example, database 318 can be a SQL database. Database 318 can store information associated with each slot in the test bench. As non-limiting examples, database 318 can store for each slot, test details, test history, test logs, DUT information (e.g., DUT serial number, model name, etc), testing preferences/configuration, user interface details/preferences/configuration, billing information, cloud push information, MSO/customer information (media subscriber organization), OEM (original equipment manufacturer) information, slot information, user information, and any persistent data needed by the universal device testing system for running tests.

According to certain embodiments, universal tester 306 may include web sockets 320 that are in communication (e.g., TCP/IP) with browser user interface or operator dashboard 302 and core testing processor 324. According to certain embodiments, core testing processor 324 is in communication with test controller 304 (e.g., TCP/IP) and in communication (e.g., Telnet/SSH secure shell) with probes/containers (328, 330, . . . , 332, 334). Core testing processor 324 is also in communication with configuration modules 322 (e.g., testing and environment configuration). Non-limiting examples of probes include Wifi probe 328, LAN probe 330, MoCA probe 332 and WAN probe 334. There may be other types of probes including MoCA WAN probe, MoCA LAN probe and other types of wireless probes besides Wifi probes depending on the characteristics of the device being tested.

According to certain embodiments, Wifi probe 328, LAN probe 330, MoCA probe 332 and WAN probe 334 communicate with the respective device under test through the relevant ports on the device such as Wifi port 336, LAN port 338, MoCA port 340 and WAN port 342. Core testing processor 324 executes the relevant configured tests for the respective DUT. Status and test results can be sent to the user's dashboard (using JSON format messages as a non-limiting example) via the web-sockets.

According to certain embodiments, when executing a specific test for a given DUT, the core testing processor loads and reads test configuration information (for example from an XML structure) and identifies the relevant test script that needs to be executed. Inputs that are needed for executing the relevant test script are retrieved and supplied as inputs to the relevant test script. The following is a non-limiting sample script.

Create DUT object & Environment Object
Verify Serial Number
Verify Warranty
Check Report Server
Check DUT Staging
    Checks for DUT Serial number in Database or Webservice
Get DUT Readiness Information
    Checks Webservice for test readiness status of DUT in the test process
Configure Container Environment
Clear Environment Temp Files
Analyze DUT for Factory Reset
    Checks ability to login to DUT
    Asks operator to manually Factory Reset if unable to login
Confirm Factory Reset (if needed)
    Waits for operator to confirm that DUT was factory reset and booted up properly
Check Ethernet LAN connections to DUT
    Ping connections: Eth LAN 1, 2, 3, 4
    Fails if any ping to these connections fail
Detect DUT
    Checks connection to DUT through socket connection
Reset Password
    Operator scans password which is stored temporarily for use in the remainder of test until finished
Login to GUI
    Done through web-scraping
Get DUT Information and compare values
    Information retrieved through web-scraping
Enable Telnet
    Enables telnet on DUT through web-scraping
Factory Reset
    Factory resets DUT through telnet command
Enable Telnet after Factory Reset
    Enables telnet on DUT through web-scraping
Confirm Power, WAN Ethernet, and Internet LEDs
Confirm all LAN Ethernet LEDs
Confirm WiFi LED
Configure Wireless Network
    Through telnet commands
    Sets N Mode
    Enables Privacy
    Sets WPA (Wi-Fi Protected Access)
    Removes WEP (Wired Equivalent Privacy)
    Assigns WiFi Channel to DUT (channel different by slot)
    [Channel 1: slots 1, 4, 7, 10, 13, 16]
    [Channel 6: slots 2, 5, 8, 11, 14]
    [Channel 11: slots 3, 6, 9, 12, 15]
    Verifies changes through GUI
    Disables WiFi once done through telnet
Check Firmware Version and Upgrade Firmware (if needed)
    Firmware version: 40.21.18
Cage Closed Confirmation Check
    Asks Operator to Close Door on Cage
Connect Wireless Card
    Waits on shared Resource Server (located on TC) for Resource L2 (Layer 2) Lock
    Lock waiting timeout: 600 sec
    All L2 Locks are able to run in parallel but not when any L3 (Layer 3) Lock is running
    Obtains Lock
    Enables WiFi through telnet
    Set WiFi Card
    Total Retries allowed: 6 (2 sets of 3 retries)
    Ping WiFi from DUT
    L2 ARP Test on WiFi: must receive 10/10 ARP packets
    Total Retries allowed: 6 (2 sets of 3 retries)
    If either Set WiFi Card or L2 ARP Test Fail after its 3 retries, Ask Operator to Check Antennas
    Performs one more retry in full (set of 3 retries each for Set WiFi Card and L2 ARP Wifi Test) after Check Antennas
    Disables WiFi through telnet
    Releases Lock
Wireless to LAN Ethernet Speed Test
    Waits on shared Resource Server (located on TC) for Resource L3 Lock
    Lock waiting timeout: 1800 sec
    L3 Locks must be run one at a time and when no L2 Lock is running
    Obtains Lock
    Enables WiFi through telnet
    Connects WiFi Card
    Iperf3 Speed Test, 5 seconds for UDP Speed Test, 7 seconds for TCP Speed Test, Sending 200 Mbps Bandwidth
    Bandwidth must be greater than 60 Mbps on TCP (Reverse) or 70 Mbps on UDP (Forward)
    If Fail after 2 retries, ask operator to Check Antennas
    Retries up to 2 times more if still Fail
    Therefore, Total Retries allowed: 4 (2 sets of 2 retries)
    Runs sudo iwlist wlan0 scan and returns all Wireless Signals seen
    Results parsed to print all visible SSIDs and its matching Signal level
    Disables WiFi through telnet
    Releases Lock
Confirm WPS LED
Confirm LAN Coax LED
Confirm USB 1+2 LEDs
Configure WAN MoCA
Confirm WAN Coax LED
Ping WAN MoCA
L2 Test on LAN Ethernet
    Arp Test from Eth LAN 1 to Eth LAN 2, 3, 4
    Must receive 10/10 on all LAN connections
LAN Ethernet to LAN Ethernet Speed Test
    From Eth LAN 1 to Eth LAN 2, 3, 4
    Iperf3 Speed Test, 5 seconds Reverse and Forward, Sending 1200 Mbps Bandwidth
    Bandwidth must be greater than 700 Mbps
    Total Retries allowed: 2
Check WAN and LAN MoCA Data Rates
    Rx and Tx Data rates for both WAN and LAN MoCA retrieved through telnet
    All Rates must be greater than 180 Mbps
LAN Ethernet to WAN MoCA FTP Speed Test
    From Eth LAN 1 to WAN MoCA
    Iperf3 Speed Test, 5 seconds Reverse and Forward, Sending 1200 Mbps Bandwidth
    Bandwidth must be greater than 60 Mbps
    Total Retries allowed: 2
LAN MoCA to LAN Ethernet FTP Speed Test
    From Eth LAN 1 to LAN MoCA Iperf3 Speed Test, 5 seconds Reverse and Forward, Sending 240 Mbps Bandwidth
Bandwidth must be greater than 60 Mbps
Total Retries allowed: 2
LAN MoCA to WAN MoCA FTP Speed Test
From LAN MoCA to WAN MoCA
Iperf3 Speed Test, 5 seconds Reverse and Forward, Sending 240 Mbps Bandwidth
Bandwidth must be greater than 60 Mbps
Total Retries allowed: 2
Enable WAN Ethernet
Through telnet command
LAN Ethernet to WAN Ethernet FTP Speed Test
From Eth LAN 1 to Eth WAN
Iperf3 Speed Test, 5 seconds Reverse and Forward, Sending 1200 Mbps Bandwidth
Bandwidth must be greater than 700 Mbps
Total Retries allowed: 2
Clear Persistent Logs
Final Factory Restore According to certain embodiments, the core testing processor uses a reflection and command design pattern to invoke the relevant configured script(s) corresponding to each DUT being tested. For example, in the command design pattern one or more of the following are encapsulated in an object: an object, method name, arguments. According to certain embodiments, the core testing processor uses the Python "reflection" capability to execute the relevant test scripts for a given DUT. The core testing processor is agnostic of the inner workings of the relevant test scripts for a given DUT.

According to certain embodiments, lightweight software containers (virtualization containers) are used to abstract the connection of probes to the different DUT interfaces in order to avoid conflicts. Non-limiting examples of virtualization containers are Linux containers. As a non-limiting example, Linux container is an operating-system-level virtualization environment for running multiple isolated Linux systems (virtualization containers) on a single Linux control host. In other word, lightweight virtualization containers are used to ensure isolation across servers. By using virtualization containers, resources can be isolated, services restricted, and processes provisioned to have an almost completely private view of the operating system with their own process ID space, file system structure, and network interfaces. Multiple virtualization containers share the same kernel, but each virtualization container can be constrained to only use a defined amount of resources such as CPU, memory and I/O. The relevant test script might need to connect to the DUT interfaces directly or through the virtualization containers to execute the tests. The core testing processor receives the test results from running the relevant test scripts. The core testing processor can further process and interpret such results and can also send the results to the user's browser via web sockets. According to certain embodiments, the respective core testing processors are in communication (e.g., Telnet/SSH secure shell) with the virtualization containers (there may be multiple virtualization containers). The virtualization containers (probes) are in communication with corresponding DUT interfaces using Telnet/SSH/TCP/UDP/HTTP/HTTPS etc, as non-limiting examples.

According to certain embodiments, a system for testing a plurality of devices comprises: a universal tester; at least one test controller; a plurality of sets of testing probes; and a plurality of web sockets; wherein:

the universal tester is enabled for communication with a platform independent user interface through the plurality of web sockets;

each respective set of testing probes of at least a subset of the plurality of sets of testing probes are for communicating with respective ports of a respective device under test of the plurality of devices installed in the universal tester for purposes of testing; and the plurality of web sockets enable real-time bi-directional and asynchronous communication between the platform independent user interface and the universal tester for simultaneously testing the plurality of devices under test by the universal tester.

According to certain embodiments, the real-time bi-directional and asynchronous communication of the plurality of web sockets enable a user to control the testing of the plurality of devices simultaneously but asynchronously and independently of each other using the universal tester.

According to certain embodiments, the plurality of devices installed in the universal tester for purposes of simultaneous testing comprise a set of disparate devices.

According to certain embodiments, the plurality of devices installed in the universal tester for purposes of simultaneous testing comprise a set of similar devices.

According to certain embodiments, the testing system is adaptable to augmenting the test controller, the plurality of web sockets, the user interface and the plurality of sets of testing probes to accommodate testing of new types of devices.

In the foregoing specification, embodiments of the invention have been described with reference to numerous specific details that may vary from implementation to implementation. The specification and drawings are, accordingly, to be regarded in an illustrative rather than a restrictive sense.

We claim:

1. A system for testing a plurality of devices, the system comprising:
   a universal tester;
   at least one test controller;
   a plurality of sets of testing probes;
   a plurality of web sockets;
   wherein,
      the universal tester is enabled for communication with a platform independent user interface through the plurality of web sockets;
      each respective set of testing probes of at least a subset of the plurality of sets of testing probes are for communicating with respective ports of a respective device under test of the plurality of devices connected to the universal tester for purposes of testing; and
      the plurality of web sockets enables real-time bi-directional and asynchronous communication between the platform independent user interface and the universal tester for simultaneously testing the plurality of devices under test by the universal tester.

2. The system of claim 1, wherein the real-time bi-directional and asynchronous communication of the plurality of web sockets enables a user to control the testing of the plurality of devices simultaneously but asynchronously and independently of each other using the universal tester.

3. The system of claim 1, wherein the plurality of devices connected to the universal tester for purposes of simultaneous testing comprises a set of disparate devices.

4. The system of claim 1, wherein the plurality of devices connected to the universal tester for purposes of simultaneous testing comprises a set of similar devices.

5. The system of claim 1, wherein the test controller, the plurality of web sockets, the user interface, and the plurality of sets of testing probes are configured to accommodate testing of different types of devices.

6. A system for testing a plurality of devices, the system comprising:
   a universal tester;
   a plurality of sets of testing probes, each respective set of testing probes of at least a subset of the plurality of sets of testing probes are configured to communicate with respective ports of a respective device under test of the plurality of devices connected to the universal tester for purposes of testing; and
   a plurality of web sockets, the plurality of web sockets configured to enable real-time bi-directional and asynchronous communication between a platform independent user interface and the universal tester for simultaneously testing the plurality of devices under test by the universal tester.

7. The system of claim 6, wherein the real-time bi-directional and asynchronous communication of the plurality of web sockets enable a user to control the testing of the plurality of devices simultaneously but asynchronously and independently of each other using the universal tester.

8. The system of claim 6, wherein the plurality of devices connected to the universal tester for purposes of simultaneous testing comprises a set of disparate devices.

9. The system of claim 6, wherein the plurality of devices connected to the universal tester for purposes of simultaneous testing comprises a set of similar devices.

10. The system of claim 6, wherein the test controller, the plurality of web sockets, the user interface and the plurality of sets of testing probes are configured to accommodate testing of different types of devices.

* * * * *